United States Patent
Shen et al.

(10) Patent No.: US 9,541,802 B2
(45) Date of Patent: Jan. 10, 2017

(54) TFT ARRAY SUBSTRATE USED IN A DUAL DOMAIN LIQUID CRYSTAL DISPLAY PANEL AND A DUAL-DOMAIN LIQUID CRYSTAL DISPLAY PANEL

(71) Applicants: Xiamen Tianma Micro-Electronics Co., Ltd., Xiamen (CN); Tianma Micro-Electronics Co., Ltd., Shenzhen (CN)

(72) Inventors: Boping Shen, Xiamen (CN); Qin Yue, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 69 days.

(21) Appl. No.: 14/243,616

(22) Filed: Apr. 2, 2014

(65) Prior Publication Data
US 2015/0109552 A1    Apr. 23, 2015

(30) Foreign Application Priority Data
Oct. 18, 2013    (CN) .......................... 2013 1 0490923

(51) Int. Cl.
G02F 1/1343    (2006.01)
G02F 1/1368    (2006.01)
G02F 1/1337    (2006.01)

(52) U.S. Cl.
CPC ....... G02F 1/134309 (2013.01); G02F 1/1368 (2013.01); G02F 1/133707 (2013.01); G02F 2001/134345 (2013.01)

(58) Field of Classification Search
CPC ..................... G09G 2320/0209; G09G 3/3648; G09G 2340/16; G02F 1/134363; G02F 1/1396
See application file for complete search history.

(56) References Cited

U.S. PATENT DOCUMENTS

2006/0145990 A1* 7/2006 Kim ................. G02F 1/134363
345/94
2007/0216841 A1* 9/2007 Konno ............. G02F 1/134363
349/141

(Continued)

FOREIGN PATENT DOCUMENTS

CN    101620332 A    1/2010
CN    102778795 A    11/2012

Primary Examiner — Huyen Ngo
(74) Attorney, Agent, or Firm — Alston & Bird LLP (57) ABSTRACT

The present invention discloses a TFT array substrate and a display panel. Multiple pixel electrodes structured with at least one domain are arranged in each pixel area, and the angle/angles of at least one deflection in the same-sided deflections of the pixel electrodes of the same domain in the pixel area in the direction parallel to the initial arrangement direction of liquid crystal not driven by a voltage to rotate is different from the angles of other deflections. Through the design of different deflection angles of the pixel electrodes of the same domain, even under a low gray scale, since the rotating angles of liquid crystal molecules driven by different pixel electrodes are different, the inner parts of the liquid crystal molecules driven by the pixel electrodes may be relatively completely compensated.

5 Claims, 7 Drawing Sheets (56) References Cited

U.S. PATENT DOCUMENTS

| | | | |
|---|---|---|---|
| 2010/0039418 A1* | 2/2010 | Chen .................... | G09G 3/3611 |
| | | | 345/208 |
| 2016/0033826 A1* | 2/2016 | Guo .................. | G02F 1/133784 |
| | | | 257/72 |

* cited by examiner

TFT ARRAY SUBSTRATE USED IN A DUAL DOMAIN LIQUID CRYSTAL DISPLAY PANEL AND A DUAL-DOMAIN LIQUID CRYSTAL DISPLAY PANEL

CROSS REFERENCES TO RELATED APPLICATIONS

This application claims the benefit of priority to Chinese Patent Application No. 201310490923.5, filed with the Chinese Patent Office on Oct. 18, 2013 and entitled "TFT ARRAY SUBSTRATE AND DISPLAY PANEL", the content of which is incorporated herein by reference in its entirety.

FIELD OF THE INVENTION

The present invention relates to the field of liquid crystal displays, and particularly relates to a thin film transistor (TFT) array substrate and a display panel.

BACKGROUND OF THE INVENTION

Figure 1:
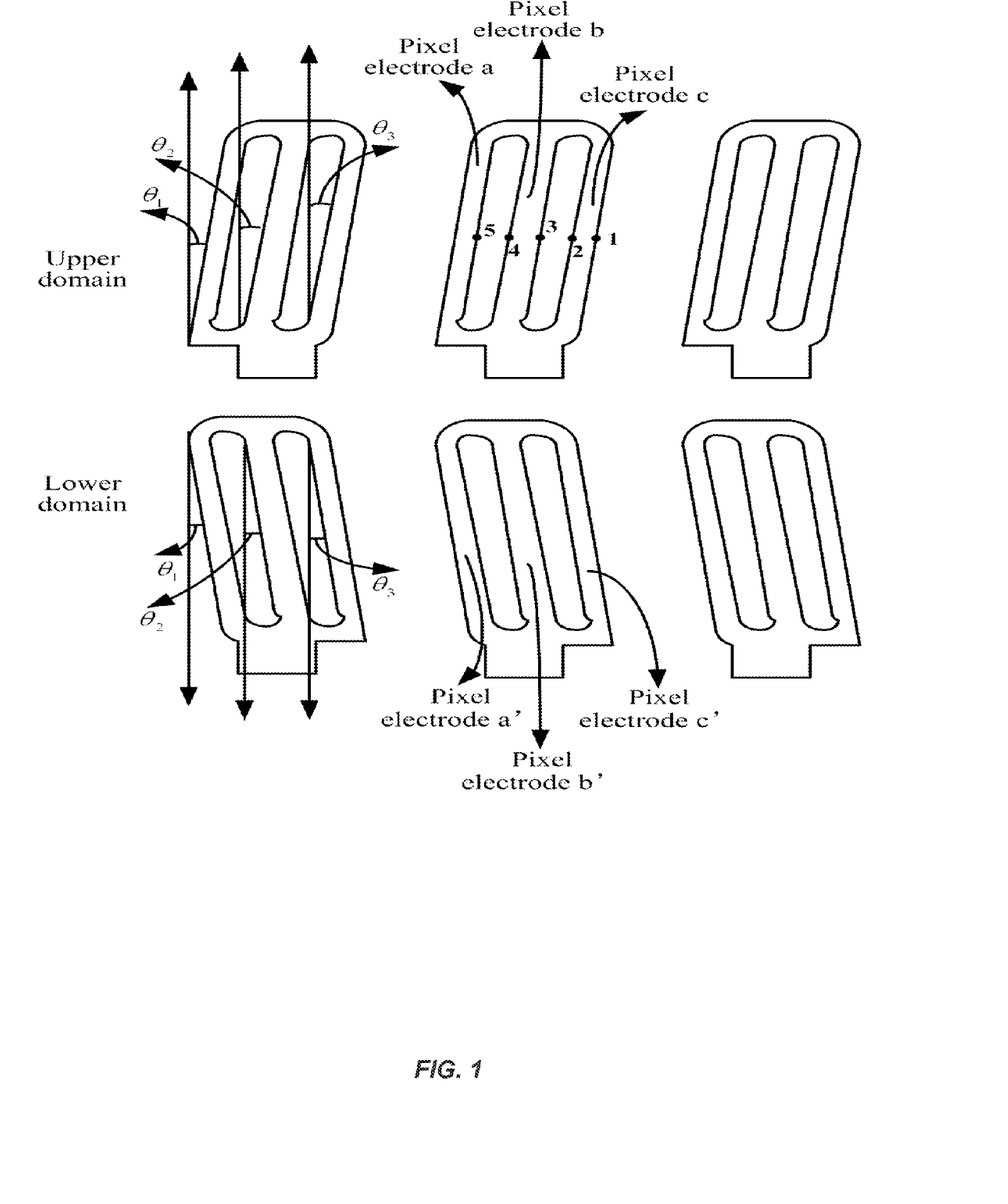
FIG. 1 is a schematic diagram of pixel electrodes with the same deflection in dual-domain design in the prior art.

In the existing dual-domain design, the design of deflection parts of upper and lower pixel electrodes is shown in FIG. 1. In a pixel area, the upper domain has three pixel electrodes (denoted pixel electrode a, pixel electrode b and pixel electrode c), the lower domain also has three pixel electrodes (denoted pixel electrode a', pixel electrode b' and pixel electrode c'), and the three pixel electrodes of each of the upper domain and the lower domain are inclined at certain angles in the direction parallel to the initial arrangement direction of liquid crystal not driven by a voltage to rotate, namely produce deflections; the angles of the deflections produced by any two pixel electrodes of the same domain are the same, namely $\theta_1=\theta_2=\theta_3$, wherein $\theta_1$, $\theta_2$ and $\theta_3$ are respectively the deflection angles of the pixel electrode a, the pixel electrode b and the pixel electrode c in the direction parallel to the initial arrangement direction of liquid crystal not driven by a voltage to rotate; and the deflections of the pixel electrodes of the upper domain and the lower domain are identical in size but opposite in direction.

Figure 2:
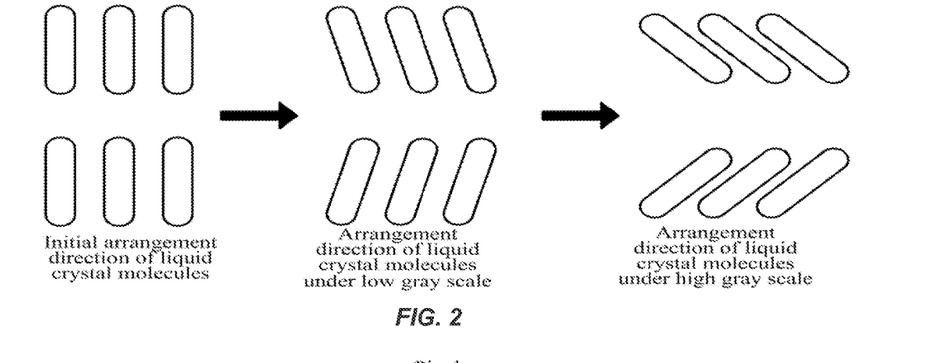
FIG. 2 is a schematic diagram that liquid crystal molecules rotate under the driving of the pixel electrodes with the same deflection as shown in FIG. 1 in the prior art.

In the dual-domain design shown in FIG. 1, when the pixel electrodes are not electrified (i.e., the liquid crystal is not driven by the voltage to rotate), the initial arrangement direction of liquid crystal molecules is shown in the left diagram of FIG. 2; and when the pixel electrodes are electrified, the liquid crystal molecules may be driven to rotate for the same angle as shown in the middle diagram and the right diagram of FIG. 2, thus realizing self-compensation of the liquid crystal molecules, suppressing color shift and tone reversal and improving optical characteristics of visual angle, color shift and the like. However, under a low gray scale, the rotation of the liquid crystal molecules is incomplete (i.e., rotating angles are relatively small), and the inner part of the liquid crystal cannot be completely compensated.

BRIEF SUMMARY OF THE INVENTION

In embodiments of the present invention, a TFT array substrate and a display panel are provided for solving the problems that the rotation of liquid crystal molecules is incomplete and the inner part of liquid crystal cannot be completely compensated under the structure of dual-domain pixel electrodes with the same deflection in the prior art.

Solutions of the embodiments of the present invention are as follows:

A TFT array substrate includes multiple pixel areas, multiple pixel electrodes structured with at least one domain are arranged in each pixel area, and the angle/angles of at least one deflection in the same-side deflections of the pixel electrodes of the same domain in each pixel area in the direction parallel to the initial arrangement direction of liquid crystal not driven by a voltage to rotate is different from the angles of other deflections.

A display panel includes the TFT array substrate.

In the solutions of the embodiments of the present invention, the angles of the same-sided deflections of the pixel electrodes in the direction parallel to the initial arrangement direction of liquid crystal not driven by voltage to rotate are different, so that the rotating angles of the liquid crystal molecules driven by the pixel electrodes are also different, thus compensation of the inner parts of the liquid crystal molecules driven by the pixel electrodes may be improved.

BRIEF DESCRIPTION OF THE DRAWINGS

To illustrate technical solutions in the embodiments of the present invention more clearly, a brief introduction on the accompanying drawings which are needed in the description of the embodiments is given below. Obviously, the accompanying drawings in the description below are merely some of the embodiments of the present invention, based on which other drawings may be obtained by those of ordinary skill in the art without any creative effort.

DETAILED DESCRIPTION OF THE INVENTION

To make the objectives, technical solutions and advantages of the present invention clearer, the present invention is further described in detail below, in conjunction with the accompanying drawings. Obviously, the described embodiments are merely a part, but not all, of the embodiments of the present invention. All of the other embodiments, obtained by those of ordinary skill in the art based on the embodiments of the present invention without any creative effort, fall into the protection scope of the present invention.

In order to solve the problem that the inner part of liquid crystal cannot be completely compensated due to incomplete rotation of liquid crystal molecules under a low gray scale, an embodiment of the present invention provides a new TFT array substrate and multiple pixel electrodes structured with at least one domain are arranged in each pixel area, wherein the angle of at least one deflection in the same-sided deflections of the pixel electrodes of the same domain in the direction parallel to the initial arrangement direction of liquid crystal molecules not driven by a voltage to rotate is different from the angles of other deflections. Experiments show that, even under the low gray scale, since the rotating angles of the liquid crystal molecules driven by different pixel electrodes are different compared with the design of the same deflection, the solution of the embodiment of the present invention enables the inner parts of the liquid crystal molecules driven by the pixel electrodes to be relatively completely compensated.

Taking an FFS (fringe field switch) liquid crystal display applying the TFT array substrate as an example, the display includes an upper substrate and a lower substrate which are opposed to each other; a liquid crystal layer is sandwiched between the upper substrate and the lower substrate, and liquid crystal molecules in the liquid crystal layer may be positive liquid crystal molecules or negative liquid crystal molecules. Multiple data lines and multiple scan lines are arranged in the upper substrate and intersected to form multiple pixel areas, and a pixel electrode and a common electrode are included in each pixel area. A TFT is arranged on the lower substrate, the pixel electrodes and the common electrodes are controlled through changing the voltage in the TFT, then the rotating directions of the liquid crystal molecules are controlled, and thus the display is controlled the light-emitting and non-light-emitting states of the polarized light of each pixel point.

The pixel electrodes involved in an embodiment of the present invention include but not limited to wedge electrodes.

In an embodiment of the present invention, the angle of at least one deflection in the same-sided deflections of the pixel electrodes of the same domain in the direction parallel to the initial arrangement direction of liquid crystal molecules not driven by a voltage to rotate is different from the angles of other deflections, wherein one alterative condition is as follows: the angle/angles of at least one deflection in the same-sided deflections of the pixel electrodes of the same domain in the direction parallel to the initial arrangement direction of liquid crystal not driven by voltage to rotate is greater than the deflection angle of the first pixel electrode in each pixel area in the direction parallel to the initial arrangement direction of liquid crystal not driven by voltage to rotate. Another alternative condition is as follows: the angle of at least one deflection in the same-sided deflections of the pixel electrodes of the same domain in the direction parallel to the initial arrangement direction of liquid crystal not driven by a voltage to rotate is smaller than the deflection angle of the first pixel electrode in each pixel area in this direction.

Taking 4 same-sided deflections (from the deflection of the first pixel electrode in this direction, the deflections are successively deflection 1, deflection 2, deflection 3, and deflection 4 of the pixel electrodes of the same domain in the direction parallel to the initial arrangement direction of liquid crystal not driven by voltage to rotate as an example, the angle/angles of at least one of deflections (deflection 2 to deflection 4) is larger than that of deflection 1, or the angle of at least one of deflections (deflection 2 to deflection 4) is smaller than that of deflection 1.

Taking the condition that the angle of at least one of deflection 2 to deflection 4 is larger than that of deflection 1 as an example, assume that deflection 2 to deflection 4 are all larger than deflection 1, the angular relationship from deflection 2 to deflection 4 may be:

the angles of deflection 2 to deflection 4 are the same; or
the angles of deflection 2 and deflection 3 are the same but different from the angle of deflection 4 (in this case, deflection 4 may be larger than deflection 2 or smaller than deflection 2); or
the angles of any two of deflection 2, deflection 3 and deflection 4 are different, but there is no limit in the size relationship from deflection 2 to deflection 4, and the angles of deflection 2, deflection 3 and deflection 4 are gradually enlarged in a preferred mode.

Under the condition that the angle of at least one of deflection 2 to deflection 4 is smaller than that of deflection 1, the above-described angular relationship can also be applied to deflection 2 to deflection 4.

The same-sided deflections of the pixel electrodes of the same domain in the direction parallel to the initial arrangement direction of liquid crystal not driven by voltage to rotate in an embodiment of the present invention, which are designed according to different deflection angles, are not limited to the above-described examples, and other designs satisfying "angle/angles of the same-sided deflections of the pixel electrodes of the same domain in the direction parallel to the initial arrangement direction of liquid crystal not driven by voltage to rotate is different from the angles of the other deflections" are included in the concept of the embodiment of the present invention.

The pixel electrodes structured with at least one domain are arranged in each pixel area in an embodiment of the present invention, preferably, the pixel electrodes structured with dual domains are arranged in each pixel area, and further, the pixel electrodes structured with dual domains may be upper-domain pixel electrodes and lower-domain pixel electrodes.

Taking the pixel electrodes structured with the upper and lower domains and the condition that same-sided deflections of the pixel electrodes of the same domain in the direction parallel to the initial arrangement direction of liquid crystal not driven by voltage to rotate are gradually enlarged as an example, the TFT array substrate of an embodiment of the present invention is specifically described below. Certainly, the solution of the present invention is not limited to the following embodiment, the pixel electrodes structured with other one domain or multi domains are also included in the inventive concept of the present invention, and other angular relationships (for example, the deflections are gradually reduced) between the same-sided deflections of the pixel electrodes of the same domain in the direction parallel to the initial arrangement direction of liquid crystal not driven by a voltage to rotate are also included in the inventive concept of the present invention.

Figure 3:
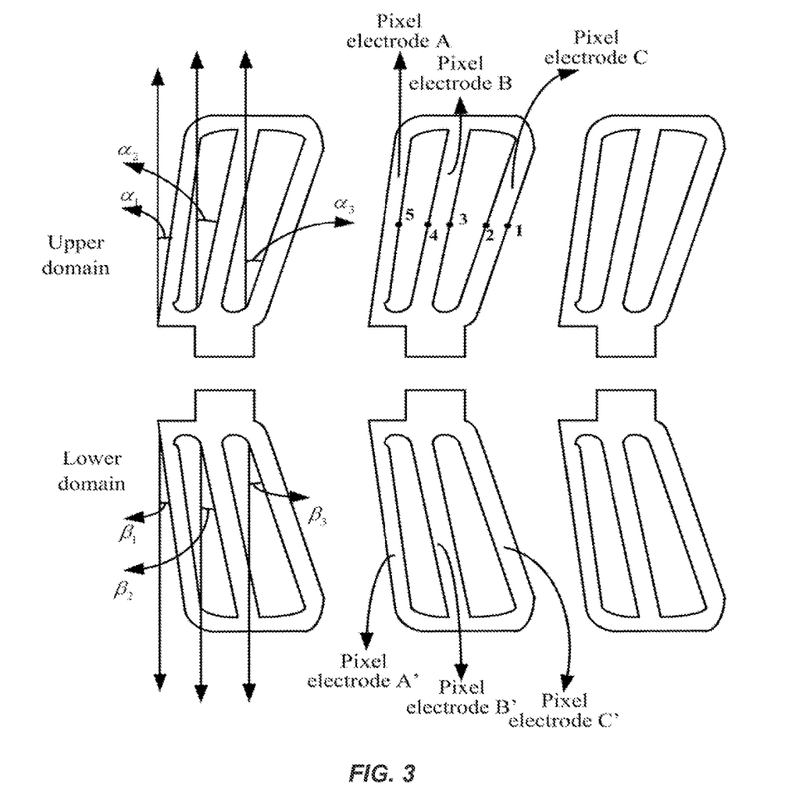
FIG. 3 is a schematic diagram of pixel electrodes with gradually enlarged deflections in dual-domain design in an embodiment of the present invention.

FIG. 3 shows a schematic diagram of deflections of pixel electrodes of upper and lower domains under the condition that a pixel area has three pairs of symmetrical pixel electrodes in the upper and lower domains and the deflection angles of the pixel electrodes of the upper and lower domains are gradually enlarged. Herein, the three pixel electrodes of the same domain (either the upper domain or the lower domain) are taken as an example for illustration. The number of the pixel electrodes of the same domain may vary with different resolutions. Thus, designs with of any other number fewer than three or greater than three of pixel electrodes are also within the inventive concept of the present invention.

It can be seen from FIG. 3 that:
the same-sided deflections of the three pixel electrodes (denoted pixel electrode A, pixel electrode B, and pixel electrode C) of the upper domain in the direction parallel to the initial arrangement direction of liquid crystal not driven by a voltage to rotate are gradually enlarged, the same-sided deflections of the three pixel electrodes (denoted pixel electrode A', pixel electrode B', and pixel electrode C') of the lower domain in this direction are also gradually enlarged, and the deflections of the corresponding pixel electrodes in the upper and lower domains in the direction parallel to the initial arrangement direction of liquid crystal not driven by voltage to rotate are identical in angle but opposite in direction, namely angles $\alpha_1$ and $\beta_1$ have identical angular size, of opposite directions; $\alpha_1$ is smaller than $\alpha_2$, $\beta_1$ is smaller than $\beta_2$, and $\alpha_2$ and $\beta_2$ are identical in angle but opposite in direction; $\alpha_2$ is smaller than $\alpha_3$, $\beta_2$ is smaller than $\beta_3$, and $\alpha_3$ and $\beta_3$ are identical in angle but opposite in direction, wherein $\alpha_1$, $\alpha_2$ and $\beta_3$ are the respective angles of the deflections of the pixel electrode A, the pixel electrode B and the pixel electrode C in the direction parallel to the initial arrangement direction of liquid crystal not driven by voltage to rotate, and $\beta_1$, $\beta_2$ and $\beta_3$ are the respective angles of the deflections of the pixel electrode A', the pixel electrode B' and the pixel electrode C' in this direction.

In the pixel electrode structure shown in FIG. 3, if the first pixel electrodes of the upper and lower domains are pixel electrode A and pixel electrode A' and the deflection angles of the pixel electrodes are gradually enlarged from left to right, the same-sided deflections of the three pixel electrodes of the upper domain in the direction parallel to the initial arrangement direction of liquid crystal not driven by voltage to rotate are gradually enlarged clockwise, and the same-sided deflections of the three pixel electrodes of the lower domain in the direction parallel to the initial arrangement direction of liquid crystal not driven by voltage to rotate are gradually enlarged counter-clockwise.

The deflection angles of the pixel electrode A and the pixel electrode A' in the pixel area in the direction parallel to the initial arrangement direction of liquid crystal not driven by voltage to rotate are between 1 and 20 degrees, and preferably, the deflection angles of the pixel electrode A and the pixel electrode A' in this direction are between 5 and 10 degrees.

The enlarged angles between any two adjacent pixel electrodes of the same domain may be the same or different, and preferably, may be set to be the same, in this way, the angles of any two adjacent liquid crystal molecules driven to rotate may be the same, so that the compensation rate in the liquid crystal molecules is improved.

Under the condition that the enlarged angles between any two adjacent pixel electrodes of the same domain are the same, the angle of the deflection of the next pixel electrode in the direction parallel to the initial arrangement direction of liquid crystal not driven by voltage to rotate may be enlarged by 3 to 5 degrees relative to the previous neighboring pixel electrode.

Simulation experiments prove that when the deflection angle of the first pixel electrode in the direction parallel to the initial arrangement direction of liquid crystal not driven by a voltage to rotate, is 7 degrees and the deflection angle of the next pixel electrode in any two adjacent pixel electrodes of the same domain in this direction is enlarged by 4 degrees relative to the previous neighboring pixel electrode, the rotation of the driven liquid crystal molecules is relatively more complete (i.e., rotating angles are relatively larger), so that the compensation rate in the liquid crystal molecules is effectively improved.

Figure 4:
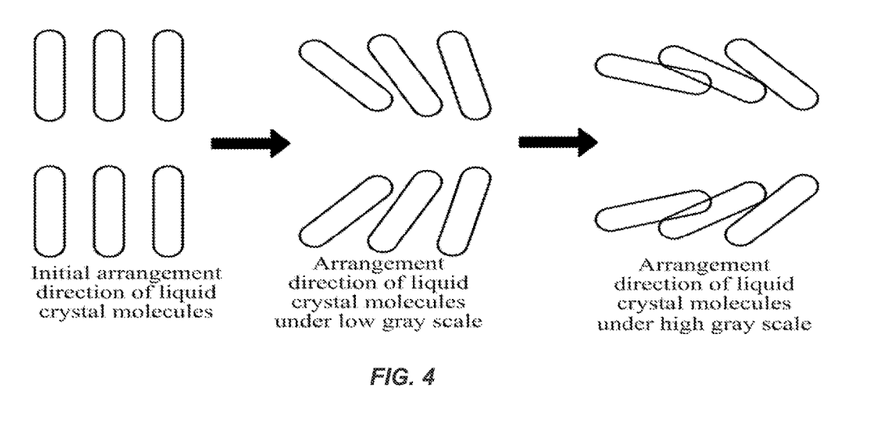
FIG. 4 is a schematic diagram that liquid crystal molecules rotate under the driving of the pixel electrodes with the gradually enlarged deflections as shown in FIG. 3 in an embodiment of the present invention.

FIG. 4 is a schematic diagram illustrating the dual-domain pixel electrodes of FIG. 3 driving liquid crystal molecules to rotate. In an initial state, the liquid crystal molecules do not rotate; when the pixel electrodes are electrified to drive the liquid crystal molecules, it can be seen that under a low gray scale, the liquid crystal molecules rotate for certain angles, and in the two adjacent liquid crystal molecules, the rotating angle of the next liquid crystal molecule is enlarged relative to the rotating angle of the previous neighboring liquid crystal molecule; and under a high gray scale, the liquid crystal molecules rotate for larger angles, but in the two adjacent liquid crystal molecules, the rotating angle of the latter liquid crystal molecule is still enlarged relative to the rotating angle of the previous neighboring liquid crystal molecule.

FIG. 3 illustrates the solution of an embodiment of the present invention, taking the condition that the deflection angles of the pixel electrodes of the upper and lower domains are gradually enlarged as an example. For the condition that the deflection angles of the pixel electrodes of the upper and lower domains are gradually reduced, the deflection angle of the first pixel electrode in each pixel area in the direction parallel to the initial arrangement direction of liquid crystal not driven by a voltage to rotate may also be between 1 and 20 degrees, and preferably, the deflection angle of the first pixel electrode in each pixel area in this direction may be 7 degrees; and in each pixel area of the same domain, in any two adjacent pixel electrodes, the deflection angle of the latter pixel electrode in this direction may be reduced by the same degrees relative to the previous neighboring pixel electrode, such as between 3 and 5 degrees.

When the liquid crystal molecules are driven by the dual-domain pixel electrodes of which the deflection angles are gradually reduced to rotate, in the two adjacent liquid crystal molecules, the rotating angle of the next liquid crystal molecule is reduced relative to the rotating angle of the previous liquid crystal molecule. Because the rotating angles of the liquid crystal molecules are different, self compensation of the liquid crystal may also be improved.

Through simulating the design of different deflection angles of the pixel electrodes of the same domain in an embodiment of the present invention and the design of the same deflection angle of pixel electrodes of the same domain as shown in FIG. 1 in the prior art, it proved that the liquid crystal molecules can be driven to rotate for different angles by using the techniques of the present invention, thus improving self compensation of the liquid crystal.

Taking the design that the same-sided deflection angles of the pixel electrodes of the same domain in the direction parallel to the initial arrangement direction of liquid crystal not driven by a voltage to rotate are gradually enlarged as an example below, simulation comparison with the design that the same-sided deflection angles of the pixel electrodes of the same domain in this direction are the same in the prior art, shows that the solution of the embodiment of the present invention may also have a certain effect of reducing color shift under the condition that the compensation in the liquid crystal is improved, and does not have an obvious influence on transmittance of liquid crystal molecules, disclination lines at the edges of pixels, visual angle and center contrast at the same time.

Figure 5A:
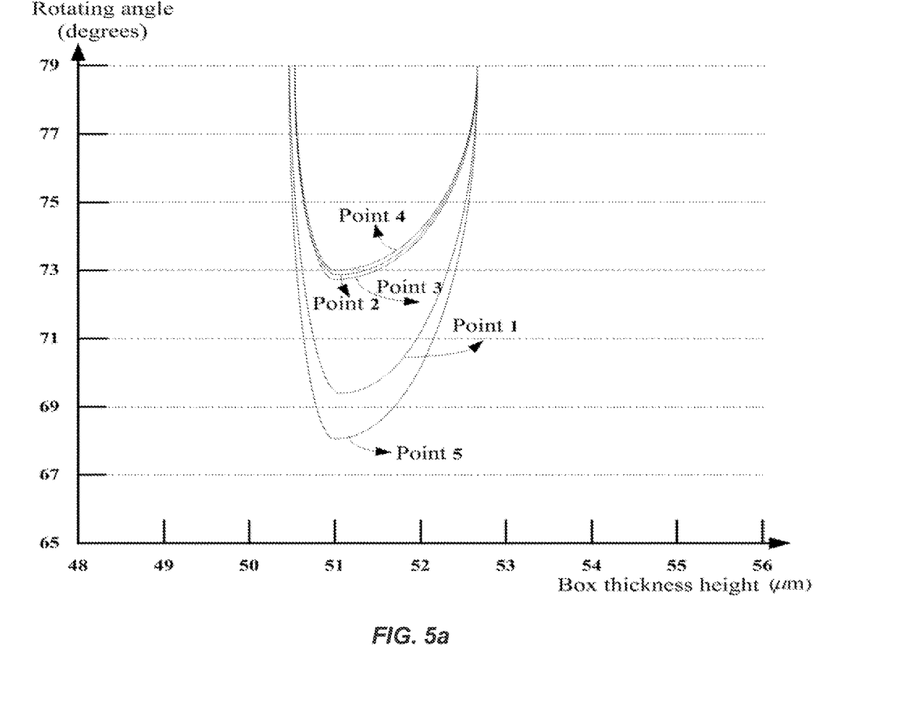
FIG. 5(a) is a graph showing a simulation schematic diagram of rotating angles of driven liquid crystal molecules at points 1, 2, 3, 4 and 5 in FIG. 3 when the liquid crystal molecules are driven with a voltage of 2V to rotate in an embodiment of the present invention.
Figure 5B:
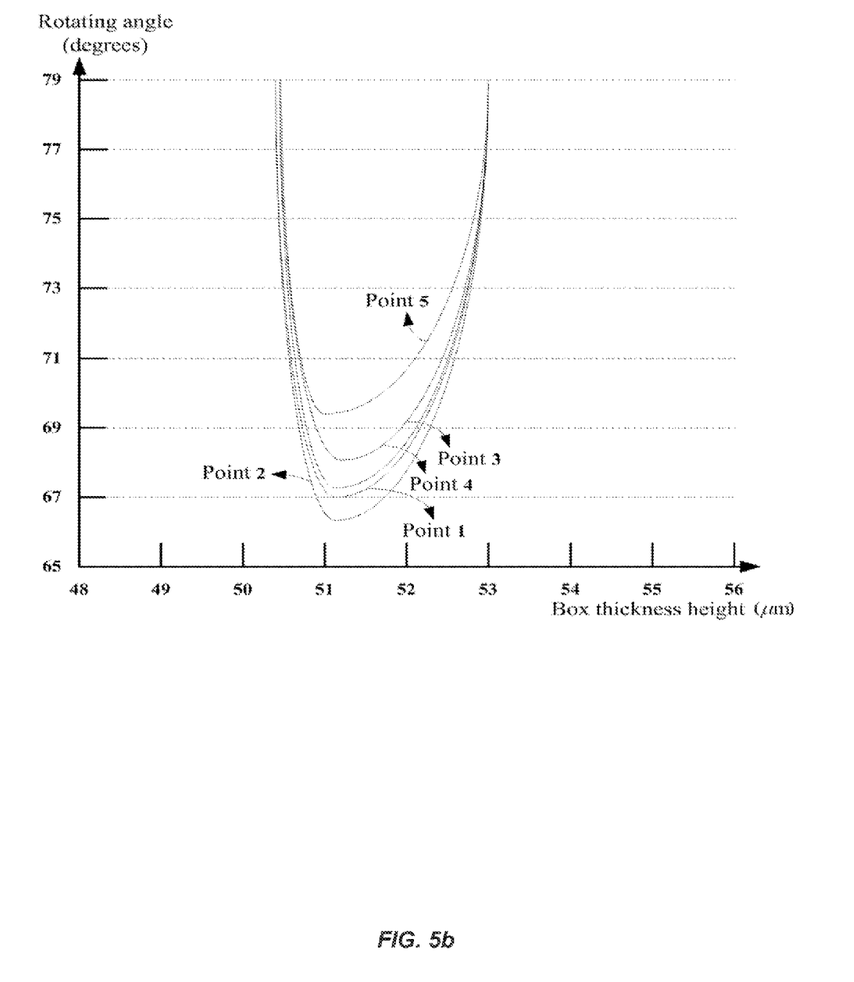
FIG. 5(b) is a graph showing a simulation schematic diagram of rotating angles of driven liquid crystal molecules at points 1, 2, 3, 4 and 5 in FIG. 1 when the liquid crystal molecules are driven with a voltage of 2V to rotate in the prior art.

FIG. 5(a) and FIG. 5(b) are graphs showing simulation schematic diagrams of rotating angles of driven liquid crystal molecules at points 1, 2, 3, 4 and 5 in FIG. 3 and a simulation schematic diagram of rotating angles of driven liquid crystal molecules at points 1, 2, 3, 4 and 5 in FIG. 1 when the liquid crystal molecules are driven by a voltage of 2V to rotate.

Comparing FIG. 5(a) with FIG. 5(b), at the minimum rotating angles of the liquid crystal molecules, the rotating angle difference of the driven liquid crystal molecules at the points 2, 3 and 4 in FIG. 5(a) is great, and the rotating angle difference of the driven liquid crystal molecules at the points 2, 3 and 4 in FIG. 5(b) is small, thus, compared with the design that the pixel electrodes have the same deflection, the deflection design solution of the embodiment of the present invention may improve the compensation in the liquid crystal.

Figure 6A:
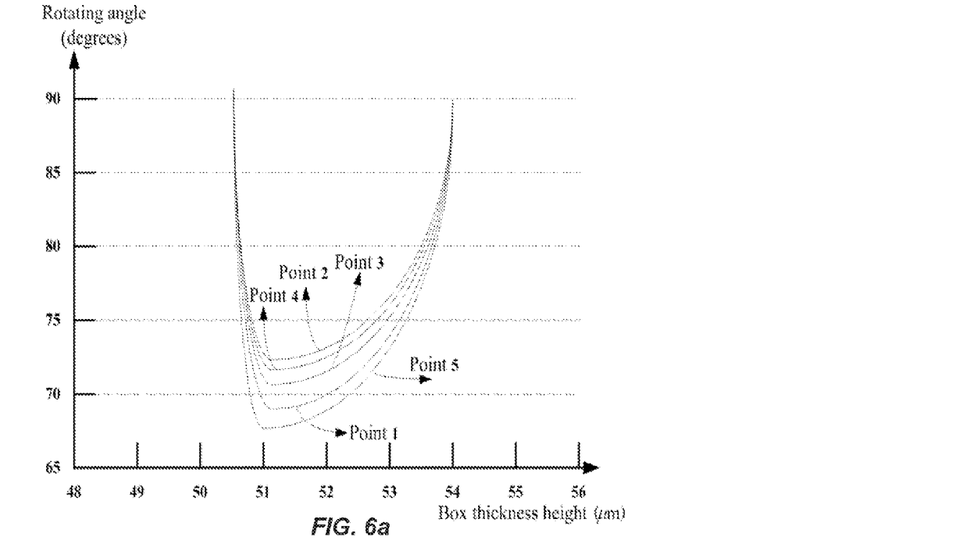
FIG. 6(a) is a graph showing a simulation schematic diagram of rotating angles of driven liquid crystal molecules at points 1, 2, 3, 4 and 5 in FIG. 3 when the liquid crystal molecules are driven with a voltage of 5V to rotate in an embodiment of the present invention.
Figure 6B:
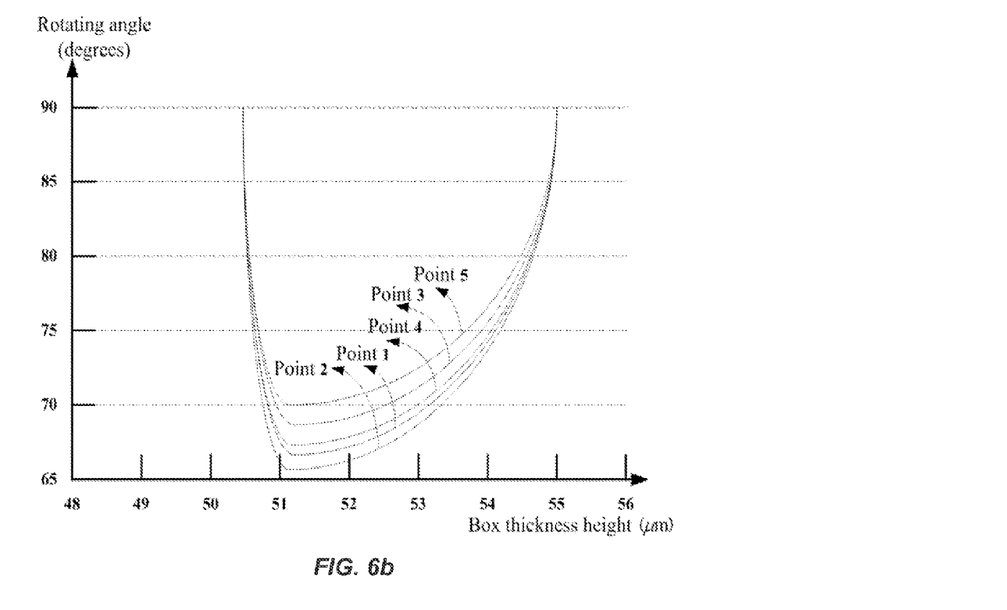
FIG. 6(b) is a graph showing a simulation schematic diagram of rotating angles of driven liquid crystal molecules at points 1, 2, 3, 4 and 5 in FIG. 1 when the liquid crystal molecules are driven with a voltage of 5V to rotate in the prior art.

From the condition of 5V voltage drive as shown in FIG. 6(a) and FIG. 6(b) (other conditions are the same as those of FIG. 5(a) and FIG. 5(b)), it can also be seen that compared with the design that the pixel electrodes have the same deflection, the deflection design solution of the embodiment of the present invention may improve the compensation in the liquid crystal.

Figure 7:
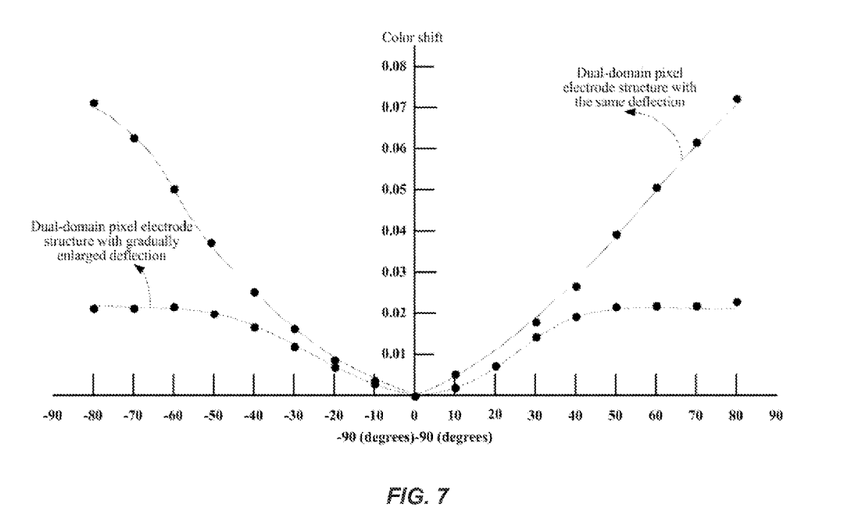
FIG. 7 is a graph showing a schematic diagram of simulation comparison of color shift under the structure of the dual-domain pixel electrodes with the gradually enlarged deflections in an embodiment of the present invention and the structure of the dual-domain pixel electrodes with the same deflection when the liquid crystal molecules are driven with the voltage of 2V.

By using the solution of the embodiment of the present invention, the compensation in the liquid crystal may be improved, and color shift may also be reduced. FIG. 7 shows a schematic diagram of simulation comparison of color shift under the structure of the dual-domain pixel electrodes with the gradually enlarged deflections in an embodiment of the present invention and the structure of the dual-domain pixel electrodes with the same deflection when the liquid crystal molecules are driven with the voltage of 2V.

Figure 8:
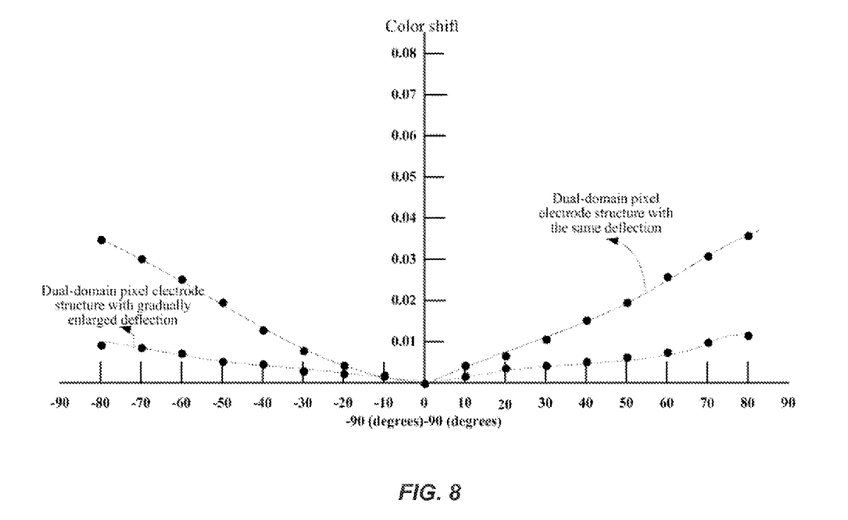
FIG. 8 is a graph showing a schematic diagram of simulation comparison of color shift under the structure of the dual-domain pixel electrodes with the gradually enlarged deflections in an embodiment of the present invention and the structure of the dual-domain pixel electrodes with the same deflection when the liquid crystal molecules are driven with the voltage of 4.5V.

FIG. 8 is a graph showing a schematic diagram of simulation comparison of color shift under the structure of the dual-domain pixel electrodes with the gradually enlarged deflections in an embodiment of the present invention and the structure of the dual-domain pixel electrodes with the same deflection when the liquid crystal molecules are driven with the voltage of 4.5V.

As the liquid crystal molecules are driven with the voltage of 2V, the color shift substantially does not exceed 0.02 when the liquid crystal molecules are driven by adopting the deflection design solution of an embodiment of the present invention, while the color shift even reaches 0.07 when the liquid crystal molecules are driven under the structure of the dual-domain pixel electrodes with the same deflection.

As the liquid crystal molecules are driven with the voltage of 4.5V, the color shift substantially does not exceed 0.01 when the liquid crystal molecules are driven by adopting the deflection design solution of the embodiment of the present invention, while the color shift even reaches 0.03 when the liquid crystal molecules are driven under the structure of the dual-domain pixel electrodes with the same deflection, thus, the color shift may be effectively reduced through the deflection design solution of the embodiment of the present invention, and the color shift is obviously improved even in white pictures.

Figure 9:
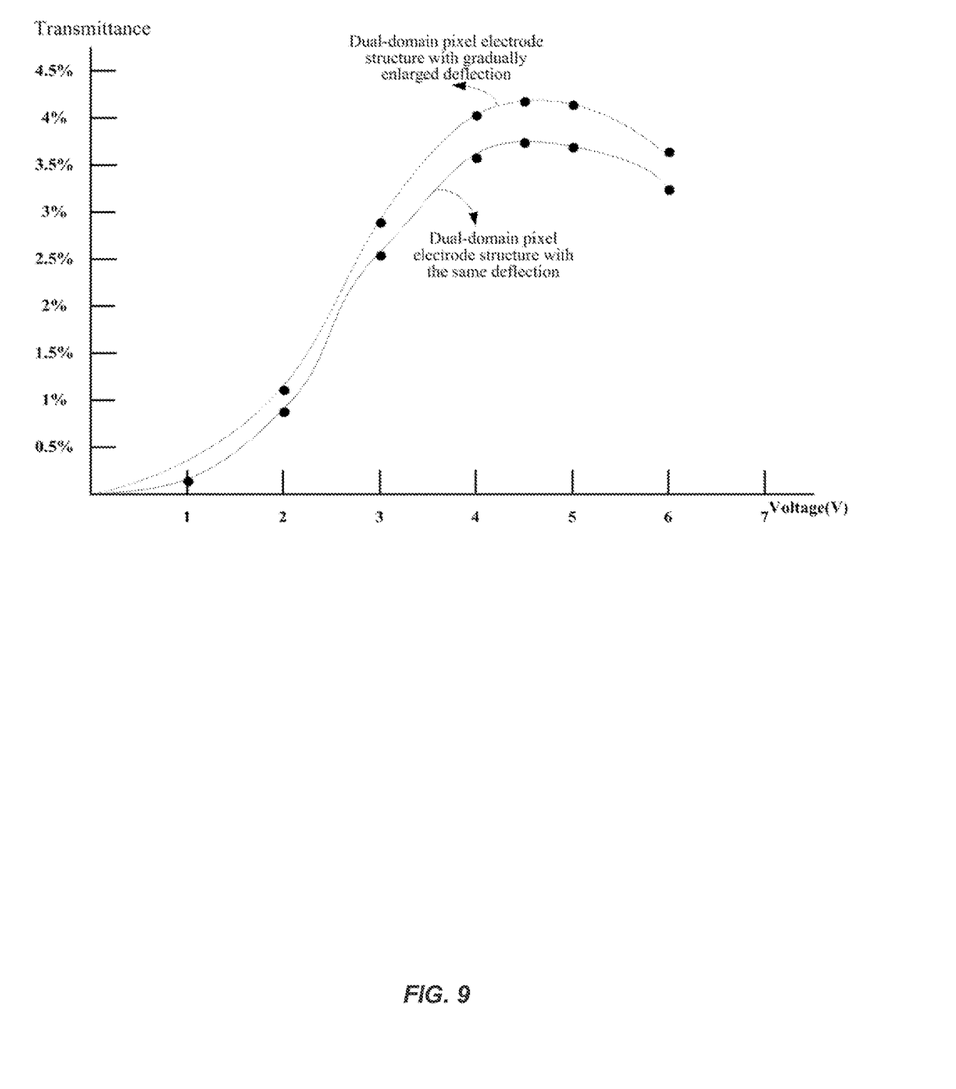
FIG. 9 is a graph showing a schematic diagram of simulation result comparison of transmittance under the structure of the dual-domain pixel electrodes with the gradually enlarged deflections in an embodiment of the present invention and the structure of the dual-domain pixel electrodes with the same deflection under different voltages.

FIG. 9 is a graph showing a schematic diagram of simulation result comparison of transmittance when the liquid crystal molecules are driven with different voltages under the structure of the dual-domain pixel electrodes with the gradually enlarged deflections in an embodiment of the present invention and the structure of the dual-domain pixel electrodes with the same deflection. It could be seen that through the solution of the embodiment of the present invention, the transmittance of the liquid crystal molecules is not reduced, and about 8 percent of transmittance is improved.

The aforementioned description is the simulation result comparison on the performance between the exemplary design that the same-sided deflection angles of the pixel electrodes of the same domain in the direction parallel to the initial arrangement direction of liquid crystal not driven by voltage to rotate in the present invention and the structure of the dual-domain pixel electrodes with the same deflection. For the performance comparison between other deflection design solutions (such as a design that the deflection angles are gradually reduced) in the inventive concept and the structure of the dual-domain pixel electrodes with the same deflection, similar simulation results may also be obtained.

Based on the description of the TFT array substrate in the embodiment of the present invention above, an embodiment of the present invention also describes a display panel including the TFT array substrate.

The display panel includes but not limited to an LCD display panel or an OLED display panel.

Although the preferred embodiments of the present application have been described, other changes and modifications could be made to these embodiments by those skilled in the art once they get the basic creative concepts. Accordingly, the appended claims are intended to be interpreted as covering the preferred embodiments and all the changes and modifications falling within the scope of this application.

Obviously, various alterations and variations could be made to this disclosure by those skilled in the art without departing from the spirit and scope of the present invention. Thus, provided that these modifications and variations made to this disclosure are within the scope of the claims of this application and equivalent technologies thereof, the invention is intended to cover all modifications and equivalents within the scope of the following claims.

What is claimed is:

1. A TFT array substrate comprising a plurality of pixel areas, each pixel area having a plurality of domains, the TFT array substrate comprising:

a plurality of pixel electrodes are arranged in each pixel area, and each domain has a plurality of pixel electrodes, wherein a deflection angle of at least one pixel electrode is different from deflection angles in same-sided deflections of other pixel electrodes of a same domain in a pixel area, wherein the deflection angle of a pixel electrode of a domain is an angle at which the pixel electrode deflected from a direction parallel to an initial arrangement direction of liquid crystal molecules not driven by a voltage to rotate.

2. The TFT array substrate according to claim 1, in the same-sided deflections of pixel electrodes in a domain in a pixel area, deflection angle of at least one pixel electrode is greater than or smaller than the deflection angle of a first pixel electrode, wherein a first pixel electrode in a domain is the first pixel electrode in the opposition direction to deflection direction in the same-sided deflections of the pixel electrodes of the domain.

3. The TFT array substrate according to claim 2, in the same-sided deflections of the pixel electrodes in a domain, deflection angles of the pixel electrodes other than the first electrode have the following angular relationship:

deflection angles of the pixel electrodes other than the first electrode are the same, and deflection angle of at least one pixel electrode is greater than or smaller than the deflection angle of the first pixel electrode; or deflection angles of a portion of the pixel electrodes other than the first electrode are the same, and deflection angle of at least one pixel electrode is greater than or smaller than the deflection angle of the first pixel electrode; or deflection angles of any two pixel electrodes other than the first electrode are different, and deflection angle of at least one pixel electrode is greater than or smaller than the deflection angle of the first pixel electrode.

4. The TFT array substrate according to claim 3, wherein in the same-sided deflections of the pixel electrodes in a domain, deflection angles of pixel electrodes are gradually increased or reduced in deflection direction.

5. The TFT array substrate according to claim 4, wherein the deflection angle of the first pixel electrode in the pixel area in the direction parallel to the initial arrangement direction of the liquid crystal molecules not driven by the voltage to rotate is between 1 and 20 degrees.

* * * * *